United States Patent
Sheppard et al.

(10) Patent No.: US 11,991,273 B2
(45) Date of Patent: May 21, 2024

(54) STORAGE DEVICE KEY MANAGEMENT FOR ENCRYPTED HOST DATA

(71) Applicant: INTERNATIONAL BUSINESS MACHINES CORPORATION, Armonk, NY (US)

(72) Inventors: Jacob L. Sheppard, Corona De Tucson, AZ (US); Igor Popov, Tucson, AZ (US); Roger G. Hathorn, Tucson, AZ (US); Bernhard Laubli, Green Valley, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 515 days.

(21) Appl. No.: 16/121,076

(22) Filed: Sep. 4, 2018

(65) Prior Publication Data

US 2020/0076585 A1    Mar. 5, 2020

(51) Int. Cl.
H04L 9/08    (2006.01)

(52) U.S. Cl.
CPC ............ *H04L 9/0838* (2013.01); *H04L 9/083* (2013.01); *H04L 9/0891* (2013.01); *H04L 9/0894* (2013.01)

(58) Field of Classification Search
CPC ..... H04L 9/0838; H04L 9/083; H04L 9/0891; H04L 9/0894
See application file for complete search history.

(56) References Cited

U.S. PATENT DOCUMENTS

| | | |
|---|---|---|
| 5,706,347 A | 1/1998 | Burke et al. |
| 6,256,740 B1 | 7/2001 | Muller et al. |
| 6,263,445 B1 | 7/2001 | Blumenau |
| 6,895,091 B1 | 5/2005 | Elliott |
| 6,973,568 B2 | 12/2005 | Hagerman |
| 7,096,335 B2 | 8/2006 | Marvit |
| 7,240,202 B1 | 7/2007 | Orman |

(Continued)

FOREIGN PATENT DOCUMENTS

| | | |
|---|---|---|
| CN | 106790261 A | 5/2017 |
| EP | 2294850 B1 | 11/2011 |

(Continued)

OTHER PUBLICATIONS

Mee Loong Yang, Adnan Al-Anbuky, and William Liu; An Identity-Based Authentication Protocol for Sensor Networks; 2014 IEEE Ninth International Conference on Intelligent Sensors, Sensor Networks and Information Processing (ISSNIP)Symposium on Security, Privacy and Trust for Cyber-Physical Systems (Year: 2014).*

(Continued)

*Primary Examiner* — Yin Chen Shaw
*Assistant Examiner* — Alex D Carrasquillo
(74) *Attorney, Agent, or Firm* — Edward J. Wixted, III, Esq.; Blanche E. Schiller, Esq.; Heslin Rothenberg Farley & Mesiti P.C.

(57) ABSTRACT

Key management for encrypted data. A node, such as a storage device, obtains a shared key to be used in cryptographic operations. The obtaining includes using an identifier of another node, such as a host of the computing environment, and a unique identifier of the shared key to obtain the shared key. The obtained shared key is then used in one or more cryptographic operations.

20 Claims, 11 Drawing Sheets

(56) References Cited

U.S. PATENT DOCUMENTS

| | | | |
|---|---|---|---|
| 7,287,269 B2 | 10/2007 | Burton et al. | |
| 7,310,813 B2 | 12/2007 | Lin et al. | |
| 7,624,431 B2 | 11/2009 | Cox | |
| 7,760,882 B2 | 7/2010 | Tidwell et al. | |
| 7,831,051 B2* | 11/2010 | Zunke | H04L 9/0838 |
| | | | 713/168 |
| 7,965,843 B1 | 6/2011 | Maino et al. | |
| 8,005,227 B1 | 8/2011 | Linnell et al. | |
| 8,037,305 B2* | 10/2011 | Rahman | H04W 12/06 |
| | | | 713/153 |
| 8,281,386 B2 | 10/2012 | Milligan et al. | |
| 8,285,993 B1 | 10/2012 | Subramanian et al. | |
| 8,335,915 B2 | 12/2012 | Plotkin et al. | |
| 8,352,729 B2* | 1/2013 | Manning | H04L 63/105 |
| | | | 713/153 |
| 8,379,857 B1 | 2/2013 | Zheng | |
| 8,494,168 B1* | 7/2013 | Tolfmans | H04L 9/0894 |
| | | | 380/277 |
| 8,621,567 B2 | 12/2013 | Kleinsteiber et al. | |
| 8,625,623 B2 | 1/2014 | Saklecha et al. | |
| 8,738,898 B2* | 5/2014 | Herwono | H04L 63/062 |
| | | | 713/155 |
| 8,750,311 B2 | 6/2014 | Ayandeh | |
| 8,751,804 B1 | 6/2014 | Nyström et al. | |
| 8,774,415 B2 | 7/2014 | Baba | |
| 8,830,836 B1 | 9/2014 | de la Iglesia et al. | |
| 8,832,234 B1 | 9/2014 | Brooker et al. | |
| 8,843,748 B2* | 9/2014 | Tie | H04L 12/18 |
| | | | 713/171 |
| 8,850,205 B2 | 9/2014 | Choi et al. | |
| 8,886,934 B2 | 11/2014 | Eckert et al. | |
| 8,913,751 B2 | 12/2014 | Du et al. | |
| 9,071,424 B1 | 6/2015 | Bowness | |
| 9,106,641 B1 | 8/2015 | Hufferd | |
| 9,148,412 B2 | 9/2015 | Hofer | |
| 9,172,590 B2 | 10/2015 | Willeke et al. | |
| 9,210,100 B2 | 12/2015 | Linden et al. | |
| 9,215,076 B1 | 12/2015 | Roth | |
| 9,438,479 B1 | 9/2016 | Friedman et al. | |
| 9,548,888 B1 | 1/2017 | Fair et al. | |
| 9,571,278 B1 | 2/2017 | Harwood et al. | |
| 9,705,851 B2 | 7/2017 | Kaliski | |
| 9,742,564 B2 | 8/2017 | Moffat et al. | |
| 9,785,785 B2* | 10/2017 | O'Hare | H04L 9/3268 |
| 9,792,076 B2 | 10/2017 | Lam et al. | |
| 9,853,873 B2 | 12/2017 | Dasu et al. | |
| 9,864,874 B1* | 1/2018 | Shanbhag | H04L 9/088 |
| 9,984,238 B1* | 5/2018 | Roth | H04L 67/568 |
| 10,764,291 B2 | 9/2020 | Driever et al. | |
| 10,833,856 B2 | 11/2020 | Hathorn et al. | |
| 10,833,860 B2 | 11/2020 | Driever et al. | |
| 11,025,413 B2 | 6/2021 | Driever et al. | |
| 11,038,671 B2 | 6/2021 | Driever et al. | |
| 11,038,698 B2 | 6/2021 | Driever et al. | |
| 11,088,829 B2 | 8/2021 | Driever et al. | |
| 11,120,151 B1* | 9/2021 | Allo | G06F 21/80 |
| 2004/0005061 A1* | 1/2004 | Buer | H04L 9/083 |
| | | | 380/282 |
| 2004/0034776 A1* | 2/2004 | Fernando | H04L 9/321 |
| | | | 713/171 |
| 2004/0165726 A1 | 8/2004 | Yamamichi | |
| 2004/0257857 A1 | 12/2004 | Yamamoto et al. | |
| 2005/0113069 A1* | 5/2005 | Knauerhase | H04L 63/08 |
| | | | 455/410 |
| 2006/0010324 A1 | 1/2006 | Appenzeller | |
| 2006/0218397 A1* | 9/2006 | Brown | H04L 9/083 |
| | | | 713/168 |
| 2007/0255954 A1 | 11/2007 | Struik | |
| 2007/0260878 A1* | 11/2007 | Urivskiy | H04L 9/0891 |
| | | | 713/163 |
| 2008/0044028 A1* | 2/2008 | Sun | H04L 9/0838 |
| | | | 380/278 |
| 2008/0080714 A1* | 4/2008 | Starrett | H04L 9/083 |
| | | | 380/277 |
| 2008/0178004 A1 | 7/2008 | Wei | |
| 2008/0313462 A1* | 12/2008 | Zhao | H04L 9/0844 |
| | | | 713/170 |
| 2009/0316911 A1 | 12/2009 | Cho | |
| 2010/0031061 A1* | 2/2010 | Watanabe | G11B 20/00246 |
| | | | 713/193 |
| 2010/0290627 A1* | 11/2010 | Tsuji | H04W 12/04 |
| | | | 380/282 |
| 2011/0026714 A1 | 2/2011 | Thomas | |
| 2011/0206201 A1* | 8/2011 | Garcia Morchon | H04L 9/0838 |
| | | | 380/44 |
| 2011/0264905 A1* | 10/2011 | Ovsiannikov | H04L 63/166 |
| | | | 713/151 |
| 2012/0011360 A1* | 1/2012 | Engels | H04L 9/083 |
| | | | 380/278 |
| 2012/0076300 A1* | 3/2012 | Uchida | H04N 21/2347 |
| | | | 380/255 |
| 2012/0204040 A1 | 8/2012 | Schwartz | |
| 2012/0272055 A1* | 10/2012 | Jung | H04W 12/08 |
| | | | 713/153 |
| 2012/0290627 A1 | 11/2012 | Moram et al. | |
| 2013/0173903 A1 | 7/2013 | Obligacion | |
| 2013/0173910 A1 | 7/2013 | Hong | |
| 2013/0259227 A1* | 10/2013 | Hanatani | H04L 9/0816 |
| | | | 380/44 |
| 2013/0326233 A1* | 12/2013 | Tolfmans | G06F 21/79 |
| | | | 713/189 |
| 2014/0023192 A1* | 1/2014 | Tanizawa | H04L 9/0861 |
| | | | 380/44 |
| 2014/0173283 A1* | 6/2014 | Hanatani | H04L 9/0891 |
| | | | 713/171 |
| 2014/0369498 A1 | 12/2014 | Hammersmith | |
| 2014/0372750 A1 | 12/2014 | Antonenkov | |
| 2015/0127946 A1* | 5/2015 | Miller | G06F 21/6218 |
| | | | 713/171 |
| 2015/0281233 A1 | 10/2015 | Asenjo | |
| 2016/0043870 A1 | 2/2016 | Avanzi | |
| 2016/0099922 A1* | 4/2016 | Dover | H04L 9/0822 |
| | | | 713/171 |
| 2016/0112381 A1 | 4/2016 | Bhattacharyya | |
| 2016/0212098 A1 | 7/2016 | Roch | |
| 2016/0259561 A1 | 9/2016 | Hong et al. | |
| 2016/0360402 A1 | 12/2016 | Park | |
| 2017/0017957 A1 | 1/2017 | Radu | |
| 2017/0019382 A1* | 1/2017 | Jain | H04L 63/06 |
| 2017/0083565 A1 | 3/2017 | Gupta et al. | |
| 2017/0222994 A1 | 8/2017 | Keidar | |
| 2017/0257352 A1 | 9/2017 | Revell | |
| 2017/0317918 A1 | 11/2017 | Vemula et al. | |
| 2017/0317991 A1* | 11/2017 | Lionetti | G06F 3/0647 |
| 2017/0338948 A1 | 11/2017 | Boehl | |
| 2017/0359172 A1* | 12/2017 | Chen | H04L 9/0891 |
| 2018/0074897 A1* | 3/2018 | Resch | H04L 9/085 |
| 2018/0191501 A1* | 7/2018 | Lindemann | G06F 3/0647 |
| 2018/0270053 A1* | 9/2018 | Hanatani | H04L 9/0836 |
| 2018/0309734 A1 | 10/2018 | Yu | |
| 2018/0343258 A1 | 11/2018 | Spies | |
| 2019/0020933 A1 | 1/2019 | Bieber | |
| 2019/0068370 A1* | 2/2019 | Neerumalla | H04L 9/0822 |
| 2020/0076580 A1* | 3/2020 | Driever | H04L 9/0819 |
| 2020/0076581 A1 | 3/2020 | Driever et al. | |
| 2020/0076582 A1* | 3/2020 | Driever | H04L 63/0823 |
| 2020/0076595 A1 | 3/2020 | Driever et al. | |
| 2020/0076600 A1* | 3/2020 | Driever | H04L 63/0428 |
| 2020/0076618 A1 | 3/2020 | Driever et al. | |
| 2020/0076807 A1 | 3/2020 | Driever et al. | |
| 2021/0119784 A1 | 4/2021 | Driever et al. | |
| 2021/0144004 A1* | 5/2021 | Gray | H04L 9/302 |
| 2021/0266182 A1 | 8/2021 | Driever et al. | |

FOREIGN PATENT DOCUMENTS

| | | |
|---|---|---|
| GB | 2471282 A | 12/2010 |
| JP | 2010272951 A * | 12/2010 |
| JP | 4803145 B2 | 10/2011 |
| JP | 2016103048 A | 6/2016 |
| KR | 101300844 B1 | 8/2013 |

(56) References Cited

FOREIGN PATENT DOCUMENTS

| KR | 101726243 B1 | 4/2017 | |
|---|---|---|---|
| WO | WO-2009060283 A1 * | 5/2009 | ........... H04L 63/061 |
| WO | 2018002626 A1 | 1/2018 | |

OTHER PUBLICATIONS

Mell, P., et al., "The NIST Definition of Cloud Computing," National Institute of Standards and Technology, Information Technology Laboratory, Special Publication 800-145, Sep. 2011, pp. 1-7.
"Fibre Channel Security Protocols—2 (FC-SP-2)", Secretariat—Information Technology Industry Council, American National Standards Institute, Inc., Rev. 2.71, pp. 1-312, Jun. 12, 2012.
"Fibre Channel Link Services—(FC-LS-3)", Secretariat—Information Technology Industry Council, American National Standards Institute, Inc., Rev. 3.53, pp. 1-232, Feb. 2, 2017.
Kaufman, C., et al., "Internet Key Exchange Protocol Version 2 (IKEv2)", Internet Engineering Task Force, pp. 1-138, Sep. 2010.
Ferreira, R., et al., "Recognizing Entities Across Protocols with Unified UUID Discovery and Asymmetric Keys", Global Communications Conference (GLOBECOM), IEEE, pp. 1-7, Dec. 2013.
Jose, M.V., et al., "Enhancing Security in Resource Sharing Using Key Holding Mechanism", World Academy of Science, Engineering and Technology, International Journal of Computer, Information Systems and Control Engineering, vol. 8, No. 10, Aug. 2014, pp. 1892-1898.
McGowan, J., et al., "SAN Security", Computer and Information Security Handbook, 2nd Edition, Elsevier Inc., Chapter e51, pp. e61-e83, 2013 (no further date information available).
Tysowski, P.K., et al., "The Engineering of a Scalable Multi-Site Communications System Utilizing Quantum Key Distribution (QKD)", Quantum Science and Technology, vol. 3, No. 2, pp. 1-34, Dec. 2017.
Walenta, N., et al., "Practical aspects of security certification for commercial quantum technologies", Electro-Optical and Infrared Systems: Technology and Applications XII; and Quantum Information Science and Technology, vol. 9648, Oct. 2015, pp. 1-11.
List of IBM Patents or Patent Applications Treated as Related, Jan. 10, 2019, pp. 1-2.
Driever, Patricia G. et al., "Controlling Access Between Nodes by a Key Server," U.S. Appl. No. 16/120,894, filed Sep. 4, 2018, pp. 1-62.
Driever, Patricia G. et al., "Shared Key Processing by a Host to Secure Links," U.S. Appl. No. 16/120,933, filed Sep. 4, 2018, pp. 1-65.
Driever, Patricia G. et al., "Securing a Storage Network Using Key Server Authentication," U.S. Appl. No. 16/120,975, filed Sep. 4, 2018, pp. 1-64.
Driever, Patricia G. et al., "Shared Key Processing by a Storage Device to Secure Links," U.S. Appl. No. 16/121,006, filed Sep. 4, 2018, pp. 1-63.
Driever, Patricia G. et al., "Securing a Path at a Selected Node," U.S. Appl. No. 16/121,026, filed Sep. 4, 2018, pp. 1-64.
Driever, Patricia G. et al., "Securing a Path at a Node," U.S. Appl. No. 16/121,050, filed Sep. 4, 2018, pp. 1-63.
Driever, Patricia G. et al., "Automatic Re-Authentication of Links Using a Key Server," U.S. Appl. No. 16/121,097, filed Sep. 4, 2018, pp. 1-60.
Kent, S., "IP Encapsulating Security Payload (ESP)," Dec. 2005, pp. 1-44.
Driever, Patricia G., et al., "Securing a Path at a Selected Node," U.S. Appl. No. 17/315,779, filed May 10, 2021, pp. 1-65.
List of IBM Patents or Patent Applications Treated as Related, May 13, 2021, pp. 1-2.
Cheng, P.C., "An Architecture for the Internet Key Exchange Protocol," IBM Systems Journal, vol. 40, No. 3, 2001 (no further date information available), pp. 721-746.

\* cited by examiner

KEY STORE STRUCTURE

400

| 402 INDEX | 404 WWNN | 406 UUID | 408 WRAPPING KEY | 410 SEQUENCE # |
|---|---|---|---|---|
| 0 | XYZ | ABC | # $ % # $ | 1 |
| 1 | JKL | TUV | )( * & ! @ | 3 |
| . . . | | | | |
| n | MNO | EFG | U ^ # 0 * ! | 1 |

FIG. 4

STORAGE DEVICE KEY MANAGEMENT FOR ENCRYPTED HOST DATA

BACKGROUND

One or more aspects relate, in general, to providing security within computing environments, and in particular, to the use of encryption to provide data security within such environments.

Encryption provides data security for data and/or other information being transmitted between two entities, such as a source node and a target node coupled via a plurality of endpoints or links. To standardize aspects of encryption, various standards are provided for different types of communication protocols. For instance, the FC-SP-2 and FC-LS-3 standards are provided for Fibre Channels.

The FC-SP-2 standard, as an example, used for encrypting Fibre Channel links includes protocols for mutual authentication of two endpoints, as well as protocols for negotiating encryption keys that are used in communication sessions between the two endpoints. The standard provides support for a variety of mechanisms to authenticate the involved parties, as well as mechanisms by which key material is provided or developed. The standard is defined for several authentication infrastructures, including secret-based, certificate-based, password-based, and pre-shared key based, as examples.

Generally, a certificate-based infrastructure is considered to provide a strong form of secure authentication, as the identity of an endpoint is certified by a trusted Certificate Authority. The FC-SP-2 standard defines a mechanism by which multiple certified entities can use the public-private key pairs that the certificate binds them to in order to authenticate with each other. This authentication occurs directly between two entities through the use of the Fibre Channel Authentication protocol (FCAP), the design of which is based on authentication that uses certificates and signatures as defined in, for instance, the Internet Key Exchange (IKE) protocol.

However, the exchange and validation of certificates inline is compute intensive, as well as time-consuming. The FCAP protocol is also performed on every Fibre Channel link between the entities. Since it is to be done before any client traffic flows on the links that are to be integrity and/or security protected, it can negatively impact (elongate) the link initialization times, and hence, the time it takes to bring up and begin executing client workloads. The IKE protocol also involves fairly central processing unit intensive mathematical computations, and in an environment that includes large enterprise servers with a large number of Fibre Channel physical ports in a dynamic switched fabric connected to a large number of storage controller ports, the multiplier effect of these computations and the high volume of frame exchanges to complete the IKE protocol can also negatively affect system initialization and cause constraints in heavy normal operation.

SUMMARY

Shortcomings of the prior art are overcome and additional advantages are provided through the provision of a system for facilitating processing within a computing environment. The system includes a memory, and a node coupled to the memory. The system is configured to perform a method. The method includes obtaining, by the node, a shared key to be used in cryptographic operations. The obtaining the shared key includes using an identifier of another node and a unique identifier of the shared key to obtain the shared key. The obtained shared key is used in one or more cryptographic operations.

Computer-implemented methods and computer program products relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 4 depicts one example of a key store structure used in accordance with one or more aspects of the present invention;

DETAILED DESCRIPTION

Figure 1:
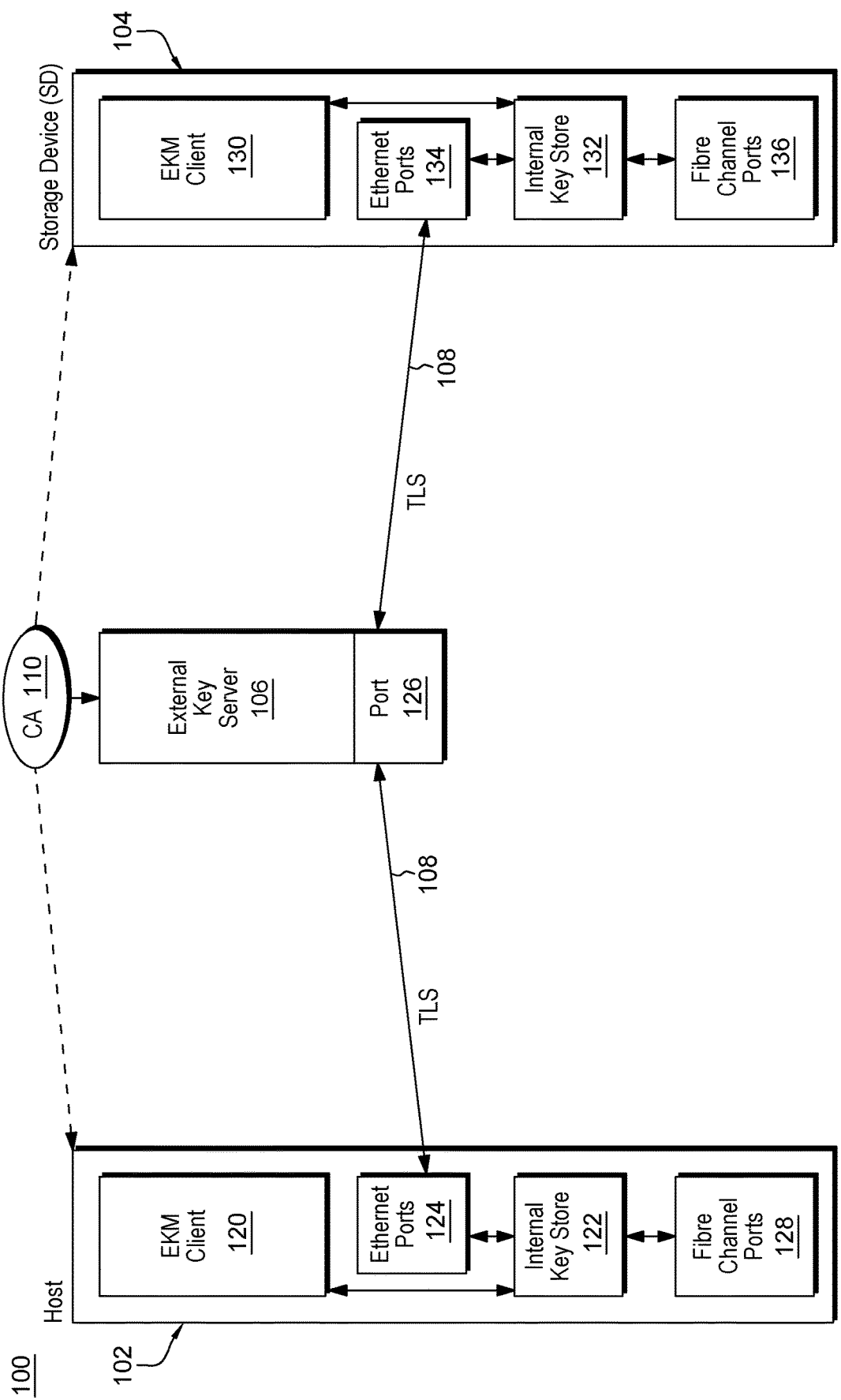
FIG. 1 depicts one example of a computing environment to incorporate and use one or more aspects of the present invention.

In one or more aspects, a shared secret key, referred to herein as a wrapping key, is used to protect the transmission of further key material between trusted endpoints or links of a communication between trusted nodes. In the examples herein, the trusted nodes are, for instance, a host and a storage device, but in other examples, the trusted nodes are a host and another host, a storage device and another storage device, and/or other types of nodes. As an example, wrapping keys are used in cryptographic operations. In one particular example, wrapping keys are used to encrypt transmit (also referred to as send) and receive keys used for in-flight data encryption between the trusted endpoints.

In particular, one or more aspects relate to obtaining, storing, and replacing a set of wrapping keys locally in a node, such as a storage device. Further, one or more aspects provide, on demand, to code running within the storage device that requires a wrapping key, a given wrapping key for a specific host.

When a new wrapping key is used, the storage device obtains it from a key server and stores it locally. The wrapping key may then be used by the host and the storage device to securely share transmit and receive keys to be used in cryptographic operations.

In one example, a host encrypts a message containing new transmit and receive keys using the function Encrypted_Message=AES256 (Wrapping_Key, Clear_Message), then sends the Encrypted_Message to the storage device. Upon receiving the Encrypted_Message, the storage device derives the new transmit and receive keys using the function Clear_Message=AES256 (Wrapping_Key, Encrypted_Message).

Further, in one example, a key look-up mechanism is employed that provides a multi-threaded look-up and recall of encryption keys for sets of nodes, e.g., sets of hosts and storage devices. The input to the wrapping key look-up is the identifier of the wrapping key and the identifier of a selected node, e.g., a host. The output is a handle used to locate the wrapping key in an internal key store.

One example of a computing environment to include one or more aspects of the present invention is described with reference to FIG. 1. In one example, a computing environment 100 includes at least one node (e.g., a host 102) and at least one other node (e.g., a storage device (SD) 104) coupled to an external key server 106 (also referred to as external key manager (EKM), key server, external key manager server, etc.) via one or more connections 108. As an example, one or more connections 108 are Ethernet connections protected with a Transport Layer Security (TLS) secure communication. Further, in one example, host 102, storage device 104 and external key server 106 are coupled to a Certificate Authority (CA) 110, which is used to sign certificates installed on the host, the storage device and the key server and to establish trust between them.

Host 102 includes, for instance, an external key manager (EKM) client 120 coupled to an internal key store 122 for storing keys. Client 102 includes the protocol used, in one example, to communicate with key server 106. Internal key store 122 is further coupled to Fibre Channel (FC) ports (e.g., FICON Channels) 128 used to communicate with storage device 104, and to Ethernet ports 124, at least one of which is coupled to a port 126 of external key server 106 via a connection 108. (FICON is a known communication path for data between the host and storage device utilizing fibre channel technology, and Ethernet is a known local area network.)

Similarly, in one example, storage device 104 includes an external key manager client 130, which is used to communicate with key server 106 and is coupled to an internal key store 132 for storing keys. Internal key store 132 is further coupled to Fibre Channel ports 136 used to communicate with host 102, and to Ethernet ports 134, at least one of which is coupled to port 126 of external key server 106 via a connection 108. Example storage devices include control units (CU), storage controllers, etc.

External key server 106 is used, as described below, to provide shared keys to the host and storage device. It is trusted by the host and the storage device via, for instance, certificates installed on the host, storage device and key server at set-up, and signed by Certificate Authority 110.

Although examples of protocols, communication paths and technologies are provided herein, one or more aspects are applicable to other types of protocols, communication paths and/or technologies. Further, other types of nodes may employ one or more aspects of the present invention. Additionally, a node may include fewer, more, and/or different components. Moreover, two nodes coupled to one another may be both the same type of node or different types of nodes. As examples, both nodes are hosts, both nodes are storage devices, or one node is a host and another node is a storage device, as described in the examples herein. Many variations are possible.

As an example, a host may be a computing device, such as a processor, a computer system, a central electronics complex (CEC), etc. One example of a computer system that may include and/or use one or more aspects of the present invention is depicted in FIG. 2A.

Figure 2A:
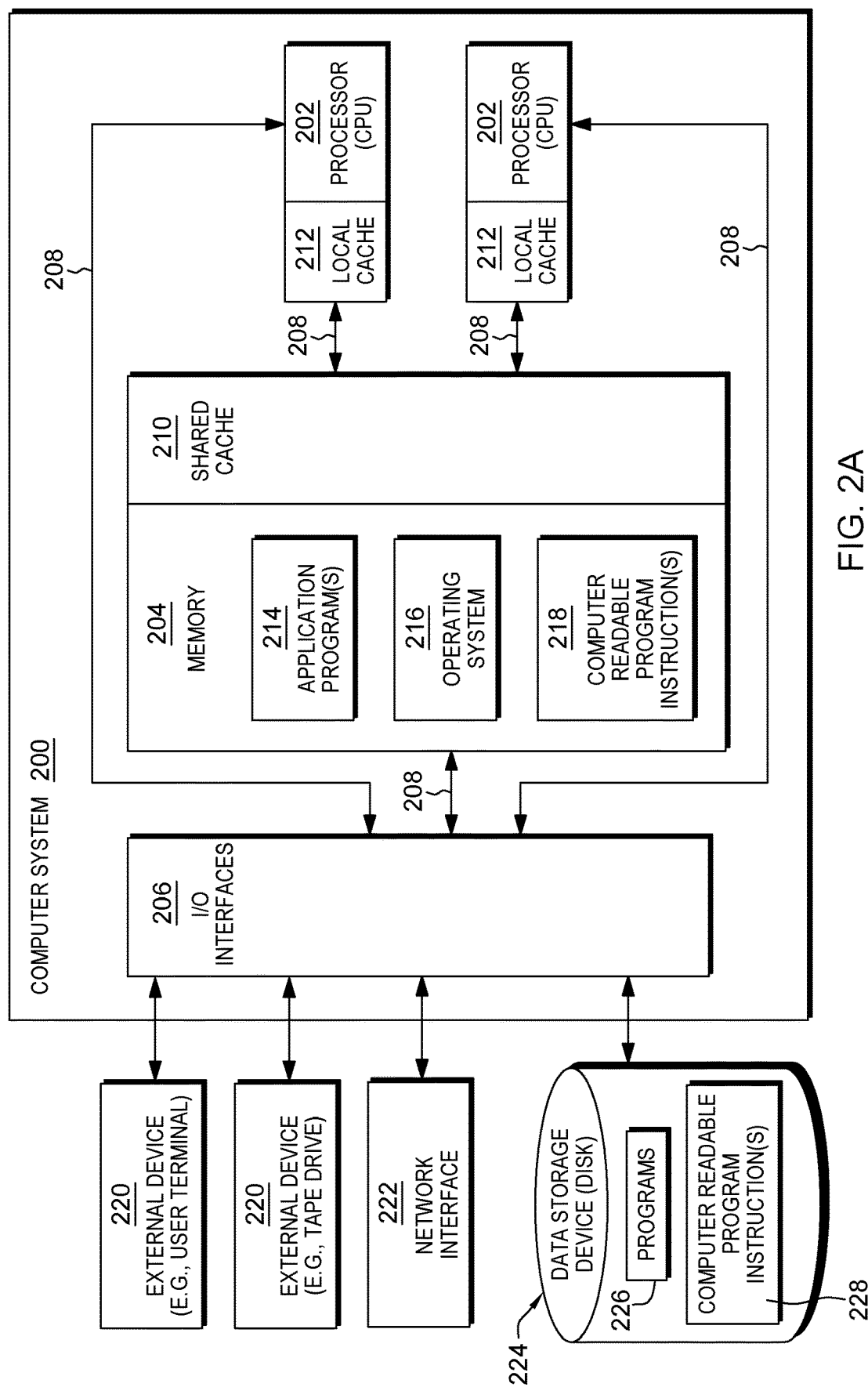
FIG. 2A depicts one example of a host of the computing environment of FIG. 1 to incorporate and/or use one or more aspects of the present invention.

Referring to FIG. 2A, in one example, a computer system 200 is shown in the form of a general-purpose computing device. Computer system 200 includes a plurality of components, which, are in addition to and/or include the components shown in FIG. 1 including, but not limited to, EKM client 120, internal key store 122, Ethernet ports 124 and Fibre Channel ports 128, which are part of and/or coupled to the computer system, but not explicitly indicated in FIG. 2A. In one example, computer system 200 includes, but is not limited to, one or more processors or processing units 202 (e.g., central processing units (CPUs)), a memory 204 (a.k.a., system memory, main memory, main storage, central storage or storage, as examples), and one or more input/output (I/O) interfaces 206, coupled to one another via one or more buses and/or other connections 208.

Bus 208 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 204 may include, for instance, a cache, such as a shared cache 210, which may be coupled to local caches 212 of processors 202. Further, memory 204 may include one or more programs or applications 214, an operating system 216, and one or more computer readable program instructions 218. Computer readable program instructions 218 may be configured to carry out functions of embodiments of aspects of the invention.

Computer system 200 may also communicate via, e.g., I/O interfaces 206 with one or more external devices 220, one or more network interfaces 222, and/or one or more data storage devices 224. Example external devices include a user terminal, a tape drive, a pointing device, a display, etc. Network interface 222 enables computer system 200 to communicate with one or more networks, such as a local area network (LAN), a general wide area network (WAN), and/or a public network (e.g., the Internet), providing communication with other computing devices or systems.

Data storage device 224 may store one or more programs 226, one or more computer readable program instructions 228, and/or data, etc. The computer readable program instructions may be configured to carry out functions of embodiments of aspects of the invention.

Computer system 200 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 200. Examples, include, but are not limited to: microcode, device drivers, redundant processing units, external disk drive arrays, RAID systems, tape drives, and data archival storage systems, etc.

Computer system 200 may be operational with numerous other general purpose or special purpose computing system environments or configurations. Examples of well-known computing systems, environments, and/or configurations that may be suitable for use with computer system 200 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

As indicated above, a computer system is one example of a host that may incorporate and/or use one or more aspects of the present invention. Another example of a host to incorporate and/or employ one or more aspects of the present invention is a central electronics complex, an example of which is depicted in FIG. 2B.

Figure 2B:
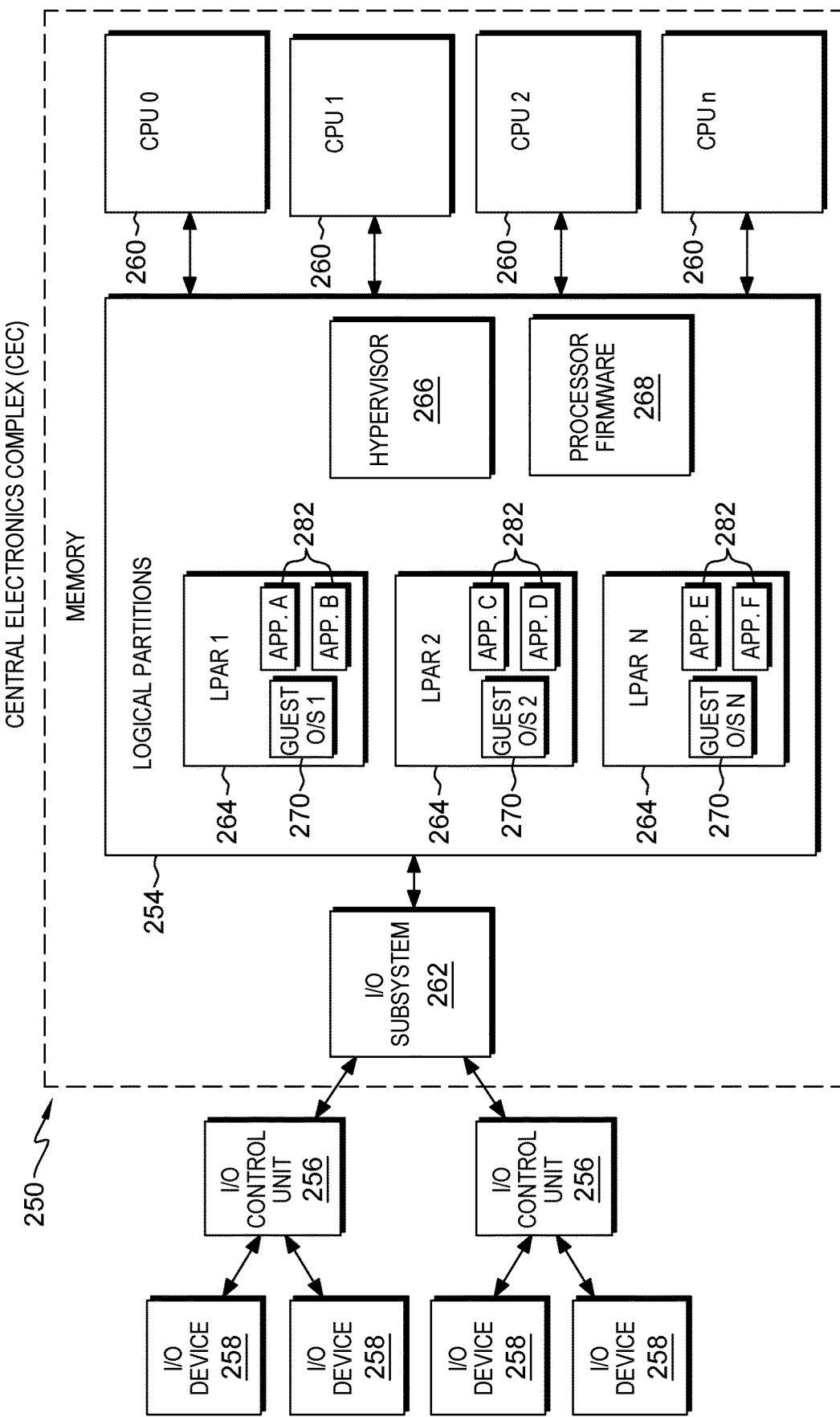
FIG. 2B depicts another example of a host of the computing environment of FIG. 1 to incorporate and/or use one or more aspects of the present invention.

Referring to FIG. 2B, in one example, a central electronics complex (CEC) 250 includes a plurality of components, which are in addition to and/or include the components shown in FIG. 1 including, but not limited to, EKM client 120, internal key store 122, Ethernet ports 124 and Fibre Channel ports 128, which are part of and/or coupled to the central electronics complex, but not explicitly indicated in FIG. 2B. In one example, CEC 250 includes, but is not limited to, a memory 254 (a.k.a., system memory, main memory, main storage, central storage, storage) coupled to one or more processors (a.k.a., central processing units (CPUs)) 260, and to an input/output subsystem 262.

In one example, memory 254 of central electronics complex 250 includes, for example, one or more logical partitions 264, a hypervisor 266 that manages the logical partitions, and processor firmware 268. One example of hypervisor 266 is the Processor Resource/System Manager (PRISM), offered by International Business Machines Corporation, Armonk, New York. As used herein, firmware includes, e.g., the microcode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

Each logical partition 264 is capable of functioning as a separate system. That is, each logical partition can be independently reset, run a guest operating system 270 such as z/OS, offered by International Business Machines Corporation, or another operating system, and operate with different programs 282. An operating system or application program running in a logical partition appears to have access to a full and complete system, but in reality, only a portion of it is available.

Memory 254 is coupled to processors (e.g., CPUs) 260, which are physical processor resources that may be allocated to the logical partitions. For instance, a logical partition 264 includes one or more logical processors, each of which represents all or a share of a physical processor resource 260 that may be dynamically allocated to the logical partition.

Further, memory 254 is coupled to I/O subsystem 262. I/O subsystem 262 may be a part of the central electronics complex or separate therefrom. It directs the flow of information between main storage 254 and input/output control units 256 and input/output (I/O) devices 258 coupled to the central electronics complex.

While various examples of hosts are described herein, other examples are also possible. Further, a host may also be referred to herein as a source, a server, a node, or an endpoint node, as examples. Additionally, a storage device may be referred to herein as a target, a node, or an endpoint node, as examples. Example storage devices include storage controllers or control units. Other examples are also possible.

Referring back to FIG. 1, in one example, one node (e.g., host 102) and another node (e.g., storage device 104) communicate with one another using encryption/decryption. For instance, a host sends an encrypted message to the storage device, and the storage device decrypts that message. This is facilitated by the use of keys. These keys include, for instance, send/receive keys, and in accordance with an aspect of the present invention, a shared key (a.k.a., a secret or wrapping key) used to communicate the send/receive keys between the host and the storage device.

In one aspect, the shared key is shared between trusted nodes (e.g., the host and the storage device). It is unique to those nodes and maintained as a secret between the trusted nodes. The nodes participate in an authentication protocol to provide a trust with one another. These nodes are referred to herein as peer nodes. The nodes communicate with one another via a plurality of links, and this trust extends to the links between the nodes facilitating authentication of the links. One example of authentication and the use of a shared key is described with reference to FIGS. 3A-3B.

Figure 3A:
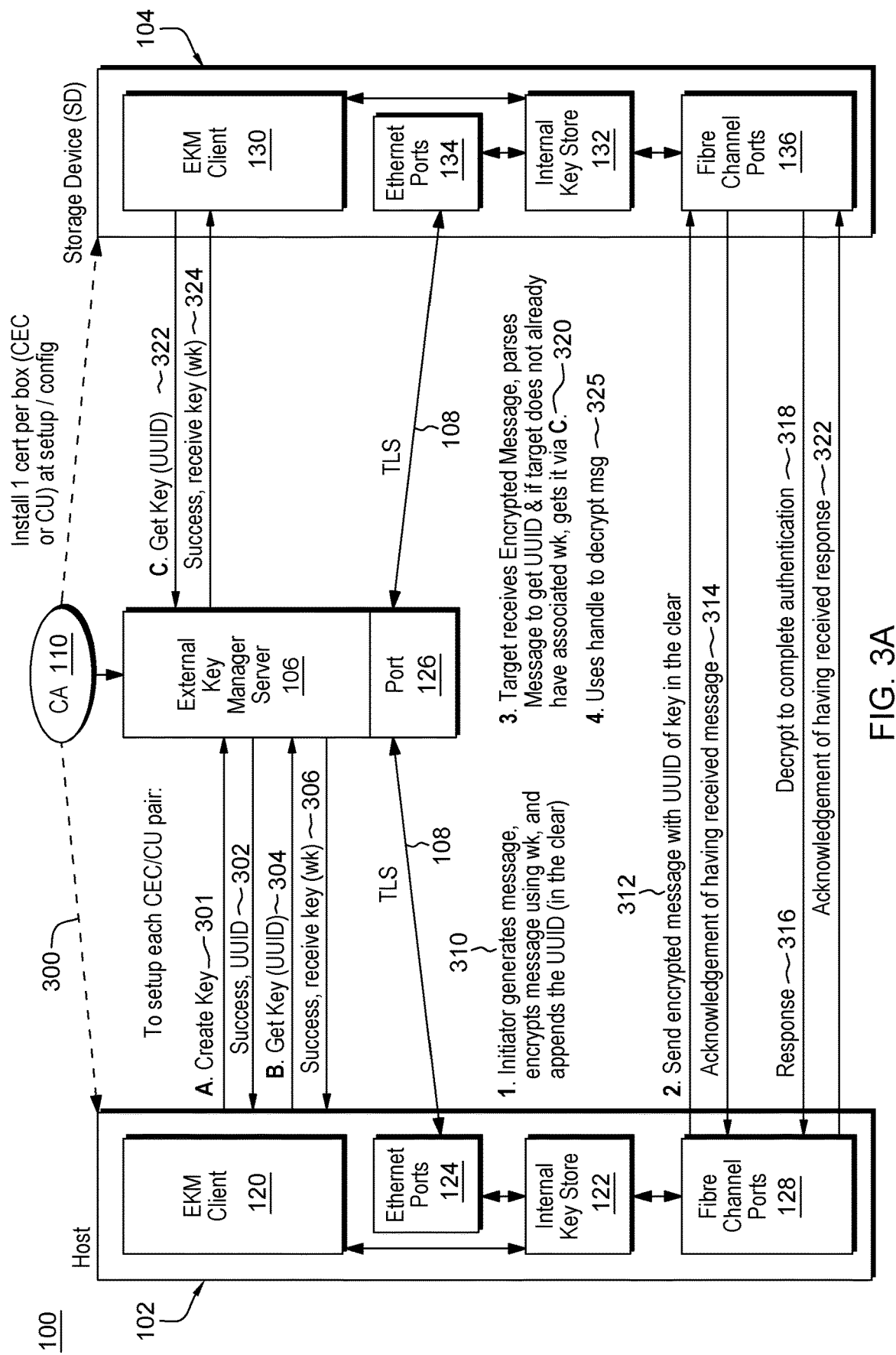
FIG. 3A depicts one example of securing a network using key server authentication and the use of keys in cryptographic operations, in accordance with one or more aspects of the present invention.

Referring to FIG. 3A, in one example, initial authentication takes place, in which one node (e.g., host 102) and another node (e.g., storage device 104) authenticate themselves using, e.g., certificates with the external key server (e.g., external key manager (EKM) server 106), STEP 300. One example of this initial authentication is described with reference to FIG. 3B.

Figure 3B:
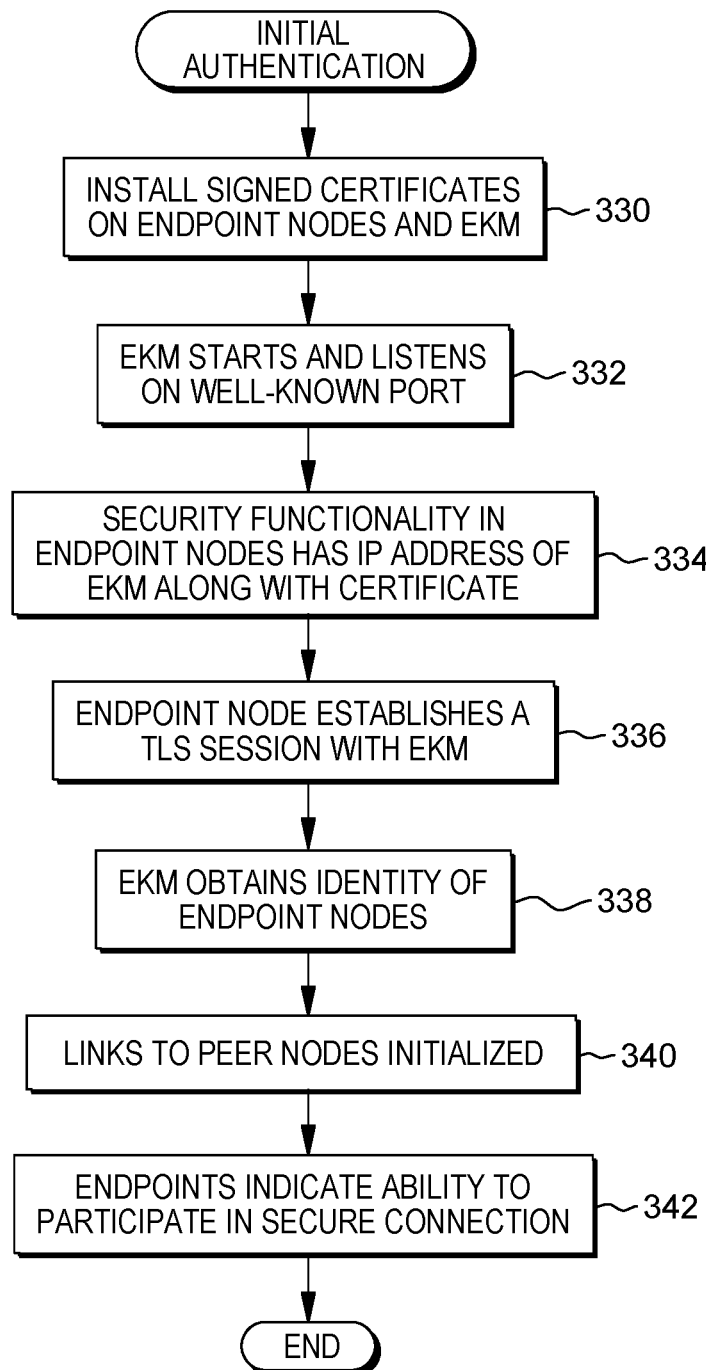
FIG. 3B depicts details of one embodiment of an initial authentication, in accordance with an aspect of the present invention.

Referring to FIG. 3B, signed certificates, signed by a Certificate Authority, are installed in each of the endpoint nodes (e.g., host 102 and storage device 104) and the key server (e.g., EKM 106), along with a certificate of the Certificate Authority, STEP 330. Each node uses the certificate signed by the Certificate Authority to authenticate itself with the external key manager, which also includes the certificates. The external key manager starts and listens on a well-known port (e.g., port 126), STEP 332. The security functionality in the endpoint nodes has the Internet Protocol (IP) address of the EKM along with its pre-installed certificate, STEP 334. The endpoint node establishes a secure session (e.g., a TLS session) with the EKM using both client and server authentication protocols, STEP 336. Further, the EKM obtains the identity of the endpoint nodes, STEP 338. For instance, a descriptive and recognizable name of the endpoint node is included in the certificate as the identity of the endpoint node. The identifier could have been preregistered into the databases of the EKM, or it can be dynamically registered and authorized through successful establishment of the TLS session along with additional optional white-list security administrator action (e.g., explicit action by a user). The protocol used to exchange commands and data with the EKM is, for instance, KMIP (Key Management Interoperability Protocol) or any other proprietary interface protocol packaged for use within the secure TLS session. TLS and KMIP are just examples. Other protocols and secure communications may be used.

Based on a node establishing a secure connection to the EKM, links to the peer nodes can be initialized, STEP 340. As part of link initialization, via, for instance, a Fibre Channel Port Login (PLOGI) command, both endpoints indicate their ability to participate in a secure connection (e.g., Secure Fibre Channel Connection), in one example, STEP 342.

Returning to FIG. 3A, subsequent to the initial authentication with the key server using certificates, further authentication is performed using a shared key (e.g., a wrapping key). A wrapping key is, for instance, an AES 256 algorithm key generated by, for instance, the key server. (In other embodiments, it is generated by another entity and stored at the key server or in storage accessible to the key server. Other possibilities also exist.) It is used in the encryption/decryption of messages transmitted between the nodes. In one example, there is a single wrapping key per node pair (e.g., per physical host/storage device pair), regardless of the logical pairings or paths between them.

In one embodiment, prior to authentication of a first security capable link between the host and the storage device, the host initiates the creation of a unique shared key (e.g., wrapping key) to be used by the host/storage device pair. For instance, the host sends a Create Key Request to the external key manager server using, e.g., secure connection 108, STEP 301. Based on the create request, external key manager server 106 creates a wrapping key (wk) and responds with a universally unique identifier (UUID) for the wrapping key, STEP 302. The UUID is, for instance, a KMIP (or other protocol) attribute assigned to an encryption key (e.g., the wrapping key) during creation. The key is created for use by the node pair by any selected technique, which may be programmatic or administrative. In the examples described herein, the node pair includes a host and a storage device. However, as indicated, this is only one example, and many variations exist.

Based on receiving the UUID, the host follows-up with a request for the wrapping key by sending, for instance, a Get Key request using the UUID obtained from external key manager server 106, STEP 304. The external key manager server responds with a wrapping key, STEP 306.

In one example, based on receiving the wrapping key, the host generates a message, encrypts the message using the wrapping key, and appends the UUID in the clear, STEP 310. In one example, the message includes other key information, such as send/receive keys to be used in encryption/decryption of messages transmitted between the host and the particular storage device. For instance, a host reads from and writes data to a storage device through a communication channel, such as a Fibre Channel, Infiniband, or a TCP/IP network. The data communicated between the host and the storage device is encrypted using a set of encryption keys, called send and receive keys. A send or transmit key is, for instance, an AES (Advanced Encryption Standard) 256 algorithm key stored, e.g., in a register of communication adapters between a host and a storage device, and used to encrypt and decrypt customer data flowing between the storage device and the host. A receive key is, for instance, an AES 256 algorithm key stored in, e.g., a register of communication adapters between a host and a storage device, and used to encrypt and decrypt data flowing between the storage device and the host. However, other examples are possible, in which the message includes other data or information.

The host sends to the storage device over a link (e.g., a Fibre Channel link) an authorization message (e.g., an Auth_ELS FC command) that includes, for instance, the UUID of the wrapping key in the clear, an agreed upon encryption technique (e.g., AES Keywrap) and the encrypted message, STEP 312. The host receives over the link an acknowledgement to the authorization message (e.g., a LS_ACC ELS response) from the storage device, STEP 314. Further, in one embodiment, the host receives a response message from the storage device, which includes content encrypted with the wrapping key, STEP 316. The host decrypts the content using the same wrapping key to complete the authentication process through validation of the received message, STEP 318. Further, in one embodiment, the host acknowledges receipt of the response, STEP 322.

In one embodiment, the host sends an authorization message that includes, for instance, the UUID of the wrapping key generated for this host-storage device pair in the clear, an agreed upon encryption technique (e.g., AES Keywrap), and an encrypted message to each secure link to be established between the host-storage device pair. This facilitates authentication on each selected link without requiring additional requests of the wrapping key from the key server, and without further authentication of the host and storage device with the key server (e.g., only one authentication per node with the key server is performed).

Thus, in accordance with one or more aspects of the present invention, one node (e.g., host 102) initiates creation of the wrapping key at the key server, obtains the wrapping key from the key server, and passes an UUID of the wrapping key to another node (e.g., storage device 104) to enable the other node to retrieve the same wrapping key from local store or the key server.

Processing associated with the role of the other node (e.g., storage device 104) in the wrapping key generation, distribution and processing is now described with reference to FIG. 3A. Based on the storage device receiving the authentication message, which includes the UUID, the agreed upon encryption technique, and the encrypted message, over a link coupling the storage device and the host, in one embodiment, the storage device acknowledges to the host successful receipt of the authentication message, STEP 314. This acknowledgement is performed, in one embodiment, for each authentication message received over each link that is to be authenticated.

Further, in one embodiment, based on the storage device receiving a first authentication message from the host on a link coupling the host and the storage device, the storage device parses the message to obtain the UUID, and then obtains the wrapping key associated with the UUID, STEP 320. In one embodiment, the storage device attempts to retrieve the wrapping key from its local key store (e.g., internal key store 132), STEP 320, but if the wrapping key is, e.g., a new key, and therefore, not in the internal store yet, the storage device requests the wrapping key from the external key manager server 106, STEP 322, as described in further detail below. External key server 106 responds with the wrapping key, STEP 324.

Based on receiving the wrapping key, the storage device decrypts the encrypted message using the wrapping key and the agreed upon encryption technique to complete, in one embodiment, the authentication process. In a further embodiment, the storage device sends an encrypted response to the host indicating successful decryption of the message, STEP 316, which the host decrypts to complete authorization, STEP 318.

In one example, based on a request for the wrapping key by a Fibre Channel port 136 of the storage device, to keep the wrapping key secret, thereby protecting it, a handle of the wrapping key is provided to port 136, rather than the wrapping key itself. The handle is an identifier associated with an instance of the wrapping key, which is created from information in internal key store 132, as described below. Based on Fibre Channel port 136 receiving the encrypted message (STEP 320), Fibre Channel port 136 requests the wrapping key from, e.g., EKM client 130. Client 130 obtains the wrapping key from key server 106 or key store 132, as well as a handle for the wrapping key. The handle is returned to port 136. Thereafter, port 136 requests that the encrypted message be decrypted by a cryptographic process (e.g., in EKM client 130) and provides the handle. The handle is used by client 130 to obtain the wrapping key from the key store and decrypt the message, STEP 325. Similarly, in creating response 316, port 136 requests client 130 to encrypt a message and provides the handle. EKM client 130 obtains the wrapping key from the key store using the handle and encrypts the message provided in the response.

The obtaining of the wrapping key by the storage device is performed, in one example, on the first receipt of the encrypted message with the UUID. It is not performed for authentication of the other links coupling the host and the storage device. Instead, for the other links, the same wrapping key, previously obtained by the storage device from the key server (or otherwise), is used to decrypt the message and send an encrypted response to the host. The wrapping key obtained from the host and the storage device may be used to encrypt/decrypt communications on all (or a selected subset) of the links between the host and the storage device.

In one aspect, the external key server dynamically generates the secret shared wrapping key upon request of the one node, and shares that wrapping key, e.g., only with the properly designated communication partner. The created wrapping key is specifically for the node pair, such that only the authorized pair of nodes has access to the wrapping key (besides the external key manager). The target node uses the wrapping key to unwrap (i.e., decrypt) other information, such as send/receive keys. Thus, the send/receive keys are not known to the external key manager, which enhances security of the send/receive keys and the system.

As described herein, in one embodiment, the wrapping keys are maintained in internal key store 122 of the host and/or internal key store 132 of the storage device to provide local access to the keys. As an example, they are maintained in a key store structure (e.g., a table) located within the internal key store. One example of a key store structure is described with reference to FIG. 4.

In one example, a key store structure 400 includes a plurality of fields, such as, for instance, an index field 402 that provides, for instance, a numerical representation of the entries within the structure, starting at 0, in one example; a WWNN field 404 indicating a worldwide node name (WWNN) of the host; a UUID field 406 indicating a universally unique identifier (UUID) for the wrapping key associated with the host/storage device pair; a wrapping key field 408 that includes the wrapping key for the host/storage device pair; and a sequence number field 410 that includes a sequence number associated with the WWNN. An entry in the key store may be referenced by its handle, which includes the index into the key store table and the sequence number.

Figure 5A:
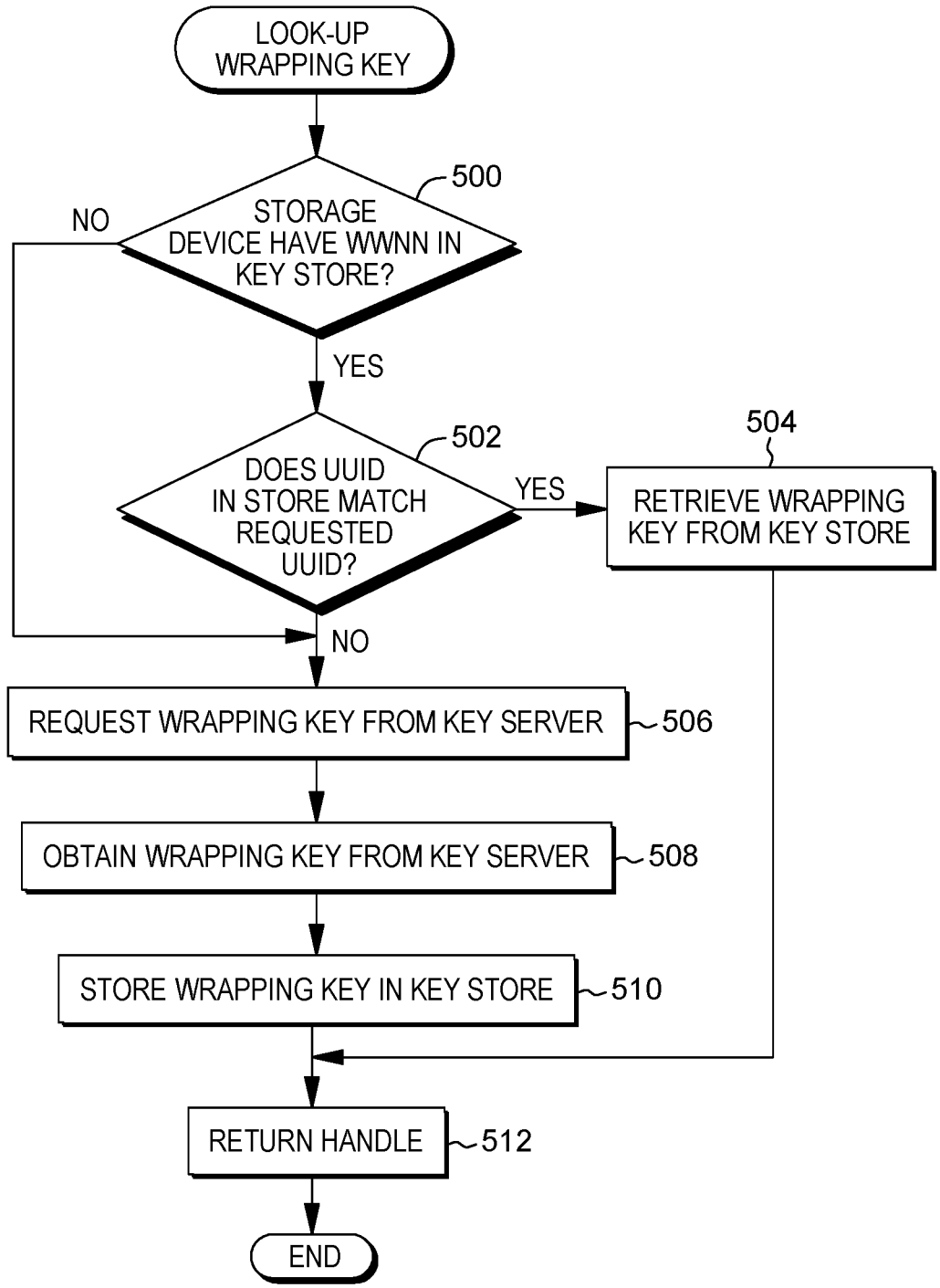
FIG. 5A depicts one example of obtaining a wrapping key, in accordance with an aspect of the present invention.

Further details regarding obtaining the wrapping key by the storage device are described with reference to FIGS. 5A-5B. Referring initially to FIG. 5A, based on a request by a requestor (e.g., port 136) for the wrapping key, a determination is made as to whether the internal key store structure (e.g., structure 400) of internal key store 132 of the storage device includes an entry that has the WWNN of the host in which the storage device is communicating, INQUIRY 500. If the storage device does have the WWNN of the host in its local key store, a further determination is made as to whether the UUID in the key store entry matches the UUID in the request, INQUIRY 502. If there is an entry in the local internal key structure of the storage device that includes a UUID matching the requested UUID and a WWNN matching the WWNN of the requested host, then the storage device retrieves the wrapping key from the internal key store (e.g., structure 400 of internal key store 132), STEP 504. Further, in one embodiment, a handle of the wrapping key is returned to the requestor (e.g., port 136), STEP 512. As an example, the handle is a concatenation of the index and the sequence number in the entry corresponding to the UUID and WWNN. In other embodiments, the handle is created in other ways using the index and the sequence number.

Returning to INQUIRY 502, if there is an entry in the internal key structure that has the WWNN of the requested host, but the wrapping key UUID in that entry does not match the requested UUID, then the storage device requests the wrapping key from the key server using the requested wrapping key UUID, STEP 506. Similarly, if there is not an entry in the internal key structure that has the WWNN of the host, INQUIRY 500, then the storage device requests the wrapping key from the key server using the requested wrapping key UUID, STEP 506.

Based on the request, the storage device obtains the wrapping key from the key server, STEP 508, and stores the wrapping key in the internal key store, STEP 510. Moreover, in one embodiment, a handle of the wrapping key is created and returned to the requestor (e.g. port 136), STEP 512. By returning the handle, instead of the wrapping key, itself, the key remains secret (e.g., known on the storage device to the cryptographic processes, but not to, e.g., ports 136). Cryptographic processes (e.g., in EKM client 130) use the handle to obtain the wrapping key from the key store, which is used in cryptographic operations (e.g., encryption, decryption). In one example, based on the key store receiving the handle from a cryptographic process, the key store looks up the wrapping key using the index portion, and then compares the sequence number in the entry to the sequence number in the handle. If they match, the wrapping key is valid. Otherwise, it is not.

Further details regarding storing the wrapping key in the key store are described with reference to FIG. 5B.

Figure 5B:
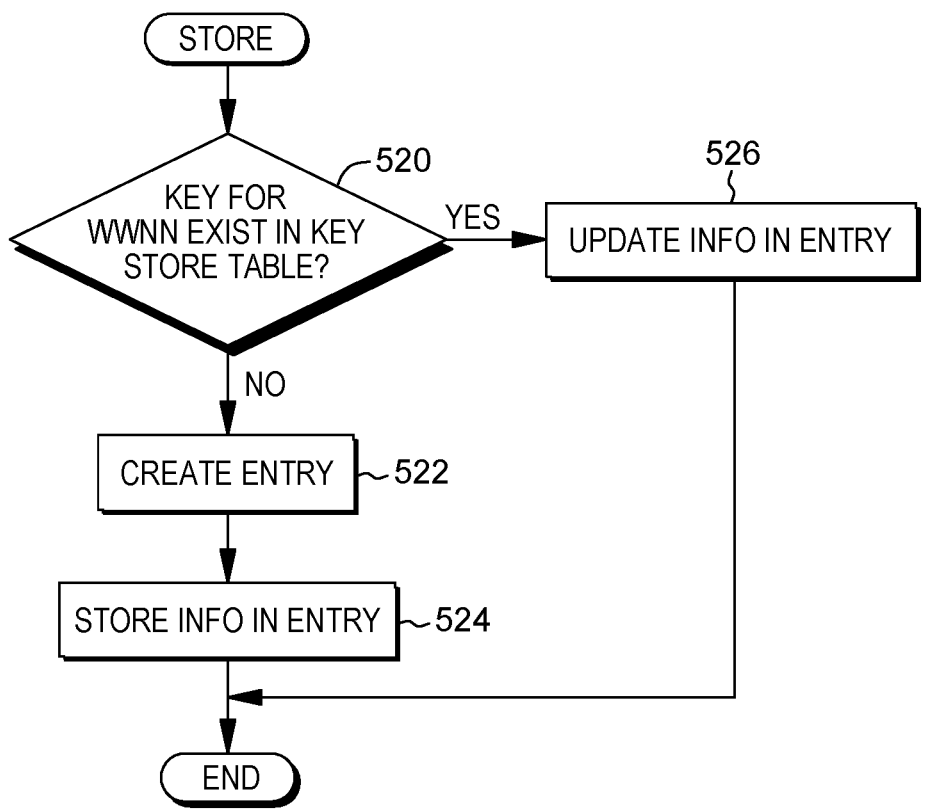
FIG. 5B depicts one example storing a wrapping key in a key store structure, in accordance with an aspect of the present invention.

Referring to FIG. 5B, in one example, a determination is made as to whether a wrapping key for the host WWNN exists in the key store structure, INQUIRY 520. If it does not exist in the key store structure, then an entry is created, STEP 522, and pertinent information is stored in the entry, STEP 524. In one example, the new entry includes an index number (e.g., in sequential order), the WWNN, the UUID, the wrapping key and a sequence number (e.g., sequence number 1). Again, the index number and sequence number are used to create a handle for the wrapping key.

Returning to INQUIRY 520, if an entry having the WWNN exists in the key store structure, then information in that entry is updated, STEP 526. This includes replacing the old wrapping key with the new wrapping key and incrementing the sequence number, as examples.

In one or more aspects, the storage of the wrapping keys in a dual node system in a cache page is managed in order to provide the keys on-demand.

One or more aspects of the present invention are inextricably tied to computer technology and facilitate processing within a computer, improving performance thereof. In one example, performance enhancement is provided relating to key handling for storage systems. Multiple wrapping keys are stored in a structure (e.g., a table) in cache in, e.g., the storage device to provide quick availability, and the ability to request new wrapping keys if the identifiers for the keys indicate a new key is to be created. The identifiers, in one example, include the WWNN of the host and the UUID of the wrapping key. By facilitating the obtaining of the wrapping keys, system performance is improved by providing faster access to customer data, as well as the continued protection of customer data.

Although various embodiments are described herein, other variations and embodiments are possible.

Figure 6A:
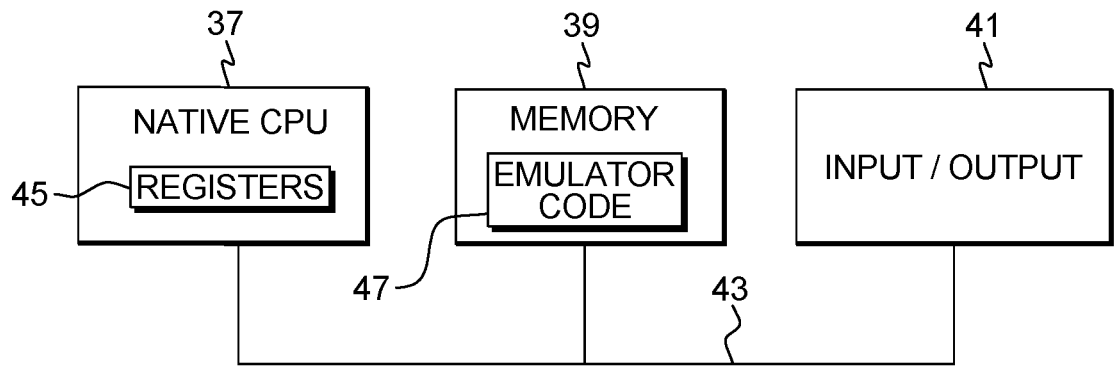
FIG. 6A depicts another example of a computing environment to incorporate and use one or more aspects of the present invention.

Further other types of computing environments may also incorporate and use one or more aspects of the present invention, including, but not limited to, emulation environments, an example of which is described with reference to FIG. 6A. In this example, a computing environment 35 includes, for instance, a native central processing unit (CPU) 37, a memory 39, and one or more input/output devices and/or interfaces 41 coupled to one another via, for example, one or more buses 43 and/or other connections. As examples, computing environment 35 may include a PowerPC processor offered by International Business Machines Corporation, Armonk, New York; and/or other machines based on architectures offered by International Business Machines Corporation, Intel, or other companies.

Native central processing unit 37 includes one or more native registers 45, such as one or more general purpose registers and/or one or more special purpose registers used during processing within the environment. These registers include information that represents the state of the environment at any particular point in time.

Moreover, native central processing unit 37 executes instructions and code that are stored in memory 39. In one particular example, the central processing unit executes emulator code 47 stored in memory 39. This code enables the computing environment configured in one architecture to emulate another architecture. For instance, emulator code 47 allows machines based on architectures other than the z/Architecture, such as PowerPC processors, or other servers or processors, to emulate the z/Architecture and to execute software and instructions developed based on the z/Architecture.

Figure 6B:
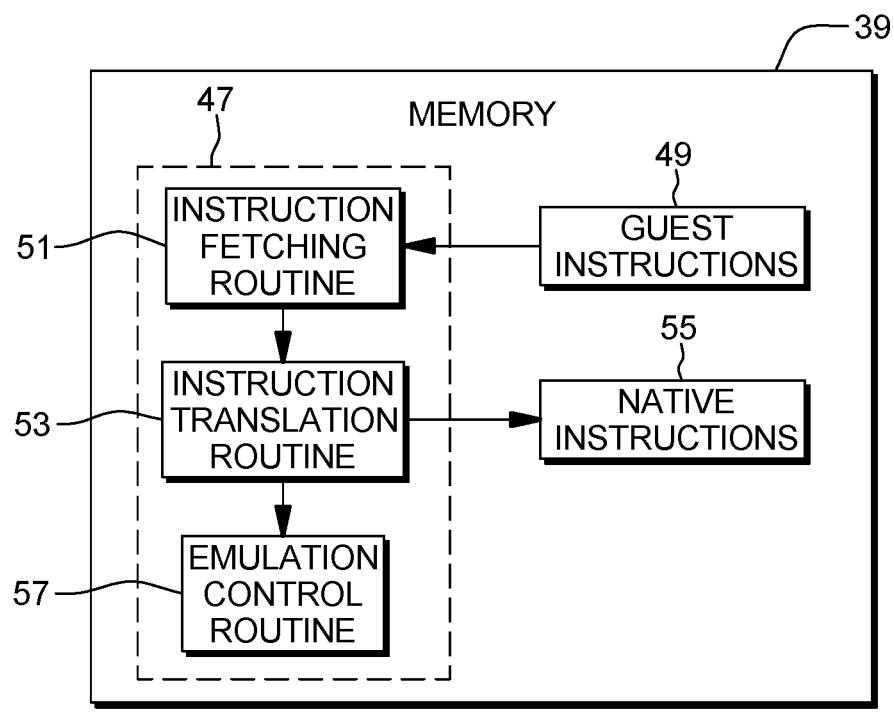
FIG. 6B depicts further details of the memory of FIG. 6A.

Further details relating to emulator code 47 are described with reference to FIG. 6B. Guest instructions 49 stored in memory 39 comprise software instructions (e.g., correlating to machine instructions) that were developed to be executed in an architecture other than that of native CPU 37. For example, guest instructions 49 may have been designed to execute on a z/Architecture processor, but instead, are being emulated on native CPU 37, which may be, for example, an Intel processor. In one example, emulator code 47 includes an instruction fetching routine 51 to obtain one or more guest instructions 49 from memory 39, and to optionally provide local buffering for the instructions obtained. It also includes an instruction translation routine 53 to determine the type of guest instruction that has been obtained and to translate the guest instruction into one or more corresponding native instructions 55. This translation includes, for instance, identifying the function to be performed by the guest instruction and choosing the native instruction(s) to perform that function.

Further, emulator code 47 includes an emulation control routine 57 to cause the native instructions to be executed. Emulation control routine 57 may cause native CPU 37 to execute a routine of native instructions that emulate one or more previously obtained guest instructions and, at the conclusion of such execution, return control to the instruction fetch routine to emulate the obtaining of the next guest instruction or a group of guest instructions. Execution of native instructions 55 may include loading data into a register from memory 39; storing data back to memory from a register; or performing some type of arithmetic or logic operation, as determined by the translation routine.

Each routine is, for instance, implemented in software, which is stored in memory and executed by native central processing unit 37. In other examples, one or more of the routines or operations are implemented in firmware, hardware, software or some combination thereof. The registers of the emulated processor may be emulated using registers 45 of the native CPU or by using locations in memory 39. In embodiments, guest instructions 49, native instructions 55 and emulator code 37 may reside in the same memory or may be disbursed among different memory devices.

A guest instruction 49 that is obtained, translated and executed may be, for instance, one of the instructions described herein. The instruction, which is of one architecture (e.g., the z/Architecture), is fetched from memory, translated and represented as a sequence of native instructions 46 of another architecture (e.g., PowerPC, pSeries, Intel, etc.). These native instructions are then executed.

One or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
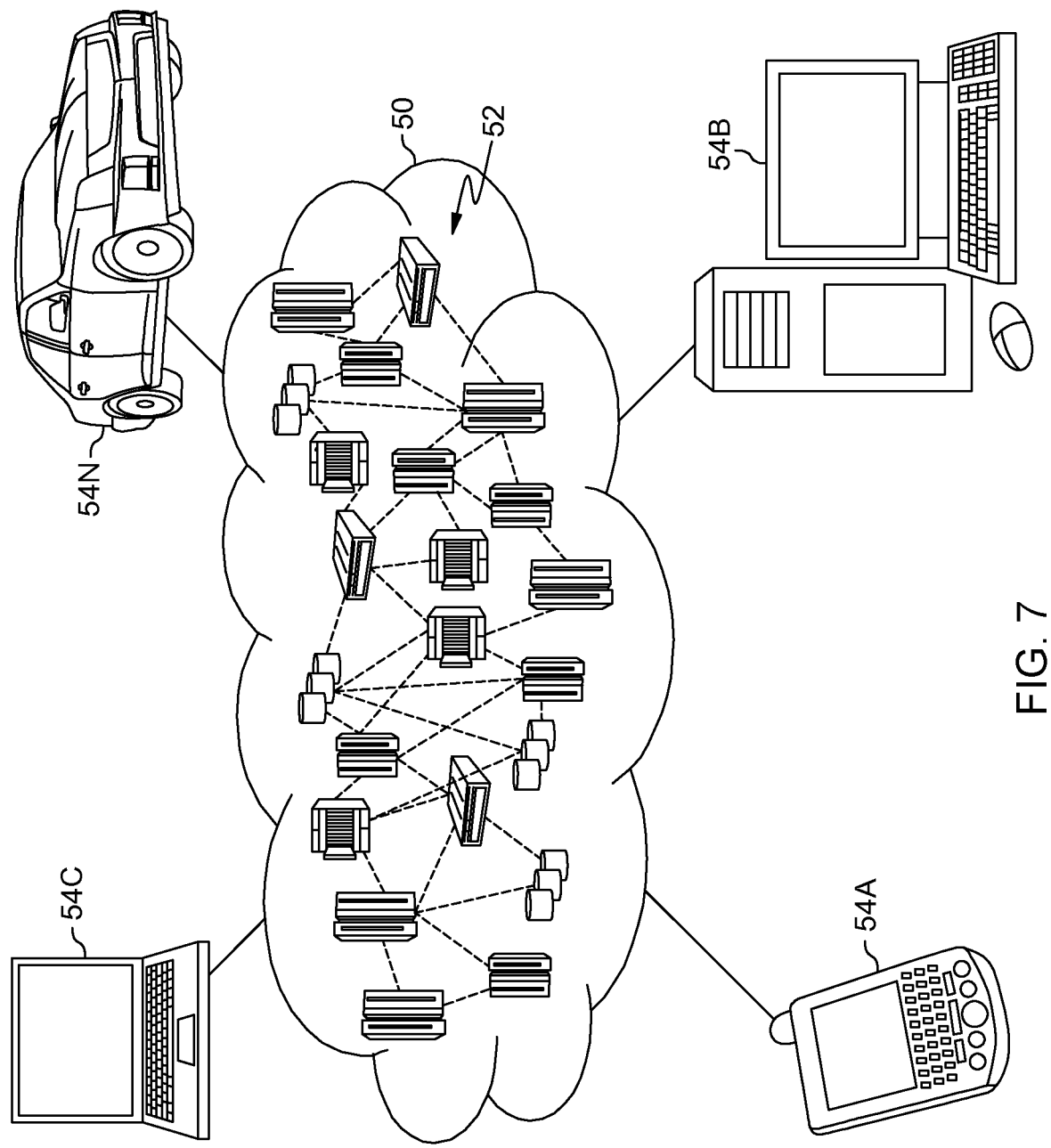
FIG. 7 depicts one embodiment of a cloud computing environment.

Referring now to FIG. 7, illustrative cloud computing environment 50 is depicted. As shown, cloud computing environment 50 includes one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 52 and cloud computing environment 50 can communicate with any type of computerized device over any type of network and/or network addressable connection (e.g., using a web browser).

Figure 8:
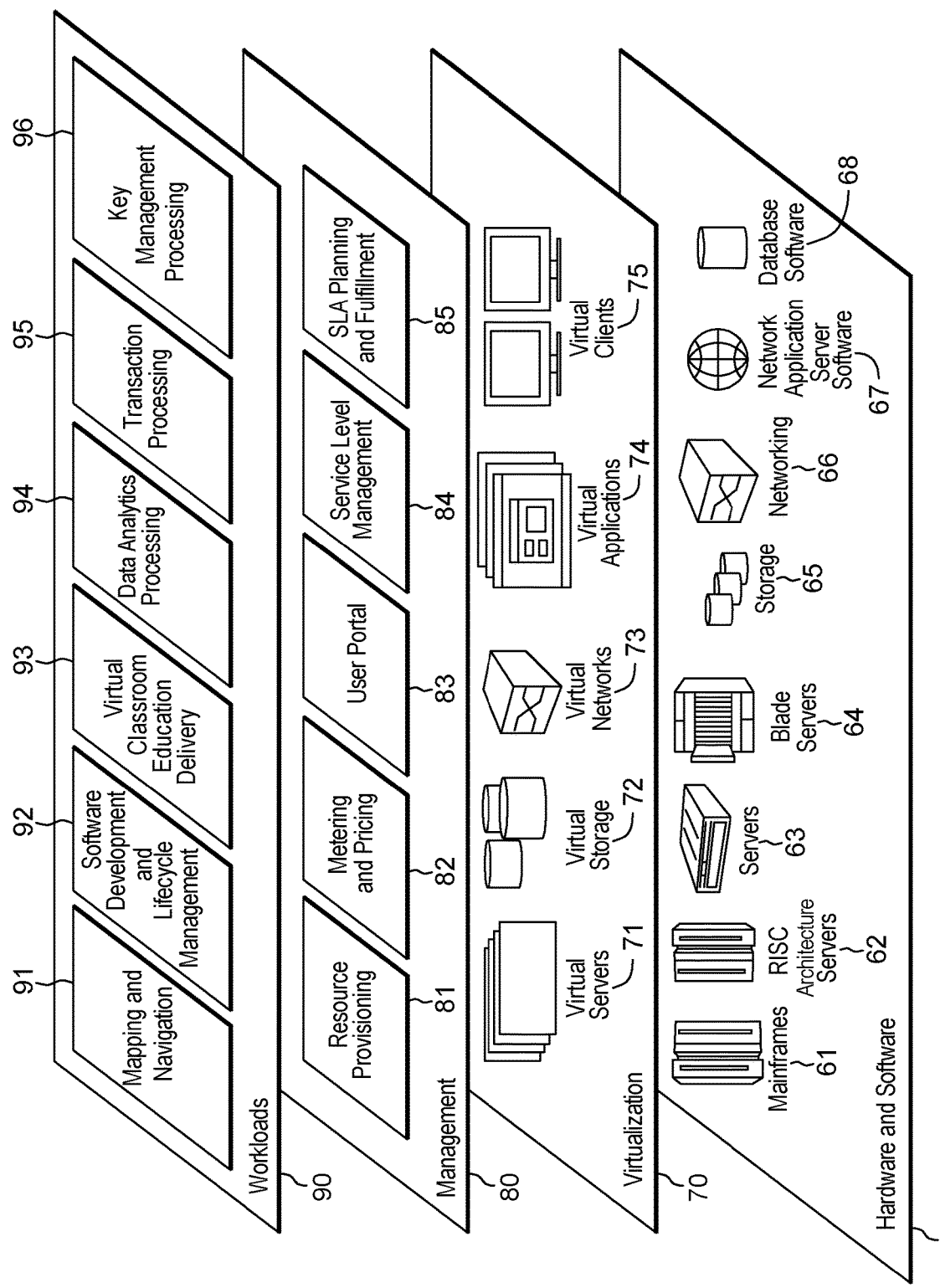
FIG. 8 depicts one example of abstraction model layers.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and key management processing 96.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions or operations may be used. Additionally, different registers may be used and/or other types of indications (other than register numbers) may be specified. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A system for facilitating processing within a computing environment, said system comprising:
   a memory; and
   a node coupled to the memory, wherein the system is configured to perform a method, said method comprising:
     obtaining, by the node, an authentication message from another node of the computing environment, the authentication message including a unique identifier of a shared key to be used in cryptographic operations, the shared key specifically generated for a selected node pair that includes the one node and the other node;
     obtaining, by the node, the shared key from a key server coupled to the node and the other node, the obtaining comprising using the unique identifier of the shared key included in the authentication message to obtain the shared key from the key server;
     using the shared key obtained from the key server in one or more cryptographic operations to, at least, authenticate a link between the node and the other node; and
     using the shared key to authenticate one or more other links between the node and the other node, the shared key being a same shared key used to authenticate the link between the node and the other node, the shared key used to authenticate the one or more other links between the node and the other node being retrieved from an internal key store of the node,
     wherein the shared key is used to authenticate a plurality of links between the selected node pair, the plurality of links including the link and the one or more other links between the node and the other node.

2. The system of claim 1, wherein the node is a storage device and the other node is a host.

3. The system of claim 1, wherein the method further comprises:
   retrieving the shared key from the internal key store to be used to authenticate the one or more other links, wherein the retrieving the shared key from the internal key store comprises:
     determining that an identifier of the other node is in an entry in a key structure within the internal key store;
     checking, based on determining that the identifier of the other node is in the key structure, that the unique identifier is in the entry, wherein the shared key is in the internal key store based on the identifier of the other node and the unique identifier being in the entry; and retrieving the shared key from the internal key store, based on the identifier of the other node and the unique identifier being in the entry.

4. The system of claim 1, wherein the method further comprises storing the shared key in a key structure within the internal key store, based on obtaining the shared key from the key server.

5. The system of claim 4, wherein the storing comprises:
creating a new entry in the key structure, based on there being no entry in the key structure having an identifier of the other node; and
storing information in the new entry, the information including the shared key.

6. The system of claim 5, wherein the information further includes the identifier of the other node and the unique identifier of the shared key.

7. The system of claim 6, wherein the information further includes a sequence number and an index, the sequence number and the index used to create a handle representing the shared key.

8. The system of claim 5, wherein the storing further comprises updating the entry with the shared key, based on determining the entry exists in the key structure.

9. A computer program product for facilitating processing within a computing environment, said computer program product comprising:
at least one computer readable storage medium readable by at least one processing circuit and storing instructions for performing a method comprising:
obtaining, by a node of the computing environment, an authentication message from another node of the computing environment, the authentication message including a unique identifier of a shared key to be used in cryptographic operations, the shared key specifically generated for a selected node pair that includes the one node and the other node;
obtaining, by the node, the shared key from a key server coupled to the node and the other node, the obtaining comprising using the unique identifier of the shared key included in the authentication message to obtain the shared key from the key server;
using the shared key obtained from the key server in one or more cryptographic operations to, at least, authenticate a link between the node and the other node; and
using the shared key to authenticate one or more other links between the node and the other node, the shared key being a same shared key used to authenticate the link between the node and the other node, the shared key used to authenticate the one or more other links between the node and the other node being retrieved from an internal key store of the node,
wherein the shared key is used to authenticate a plurality of links between the selected node pair, the plurality of links including the link and the one or more other links between the node and the other node.

10. The computer program product of claim 9, wherein the method further comprises storing the shared key in a key structure within the internal key store, based on obtaining the shared key from the key server.

11. The computer program product of claim 9, wherein the method further comprises:

retrieving the shared key from the internal key store to be used to authenticate the one or more other links, wherein the retrieving the shared key from the internal key store comprises:
determining that an identifier of the other node is in an entry in a key structure within the internal key store;
checking, based on determining that the identifier of the other node is in the key structure, that the unique identifier is in the entry, wherein the shared key is in the internal key store based on the identifier of the other node and the unique identifier being in the entry; and
retrieving the shared key from the internal key store, based on the identifier of the other node and the unique identifier being in the entry.

12. The computer program product of claim 10, wherein the storing comprises:
creating a new entry in the key structure, based on there being no entry in the key structure having an identifier of the other node; and
storing information in the new entry, the information including the shared key.

13. A computer-implemented method of facilitating processing within a computing environment, said computer-implemented method comprising:
obtaining, by a node of the computing environment, an authentication message from another node of the computing environment, the authentication message including a unique identifier of a shared key to be used in cryptographic operations, the shared key specifically generated for a selected node pair that includes the one node and the other node;
obtaining, by the node, the shared key from a key server coupled to the node and the other node, the obtaining comprising using the unique identifier of the shared key included in the authentication message to obtain the shared key from the key server;
using the shared key obtained from the key server in one or more cryptographic operations to, at least, authenticate a link between the node and the other node; and
using the shared key to authenticate one or more other links between the node and the other node, the shared key being a same shared key used to authenticate the link between the node and the other node, the shared key used to authenticate the one or more other links between the node and the other node being retrieved from an internal key store of the node,
wherein the shared key is used to authenticate a plurality of links between the selected node pair, the plurality of links including the link and the one or more other links between the node and the other node.

14. The computer-implemented method of claim 13, further comprising storing the shared key in a key structure within the internal key store, based on obtaining the shared key from the key server.

15. The computer-implemented method of claim 13, further comprising:
retrieving the shared key from the internal key store to be used to authenticate the one or more other links, wherein the retrieving the shared key from the internal key store comprises:
determining that an identifier of the other node is in an entry in a key structure within the internal key store;
checking, based on determining that the identifier of the other node is in the key structure, that the unique identifier is in the entry, wherein the shared key is in the internal key store based on the identifier of the other node and the unique identifier being in the entry; and retrieving the shared key from the internal key store, based on the identifier of the other node and the unique identifier being in the entry.

16. The computer-implemented method of claim 14, wherein the storing comprises:

creating a new entry in the key structure, based on there being no entry in the key structure having an identifier of the other node; and storing information in the new entry, the information including the shared key.

17. The system of claim 1, wherein the shared key is a shared unique secret key generated exclusively for the selected node pair.

18. The system of claim 1, wherein the shared key used to authenticate the one or more other links between the node and the other node is retrieved from the internal key store of the node, instead of the node requesting the shared key from the key server to authenticate the one or more other links.

19. The computer program product of claim 9, wherein the shared key used to authenticate the one or more other links between the node and the other node is retrieved from the internal key store of the node, instead of the node requesting the shared key from the key server to authenticate the one or more other links.

20. The computer-implemented method of claim 13, wherein the shared key used to authenticate the one or more other links between the node and the other node is retrieved from the internal key store of the node, instead of the node requesting the shared key from the key server to authenticate the one or more other links.

* * * * *